United States Patent
Yundt et al.

[11] Patent Number: 6,015,188
[45] Date of Patent: Jan. 18, 2000

[54] SWIVEL SEAT FOR A VEHICLE

[76] Inventors: Nellie K. Yundt, 10556 Southerland Dr.; Dan KinKaid, 12080 Florida St., both of Boise, Id. 83709

[21] Appl. No.: 09/248,248

[22] Filed: Feb. 10, 1999

[51] Int. Cl.[7] .......................................................... A47E 1/02
[52] U.S. Cl. ............................... 297/344.21; 297/344.26; 297/242; 5/81 HS
[58] Field of Search ..................................... 297/240, 242, 297/344.21, 344.26, 252; 5/81 HS; 108/103, 104

[56] References Cited

U.S. PATENT DOCUMENTS

| | | |
|---|---|---|
| 1,852,012 | 4/1932 | Hose . |
| 2,546,803 | 3/1951 | Waldon .................................... 108/104 |
| 2,833,609 | 5/1958 | Lawless ................................... 108/104 |
| 2,841,207 | 7/1958 | Sweeney . |
| 3,718,365 | 2/1973 | Gibson . |
| 3,789,444 | 2/1974 | McCord . |
| 4,729,336 | 3/1988 | Rohne ................................. 297/252 X |
| 4,762,364 | 8/1988 | Young . |
| 4,773,709 | 9/1988 | Slinkard ................................... 297/252 |
| 4,802,708 | 2/1989 | Vos et al. ............................ 297/252 X |
| 4,936,629 | 6/1990 | Young . |
| 4,971,392 | 11/1990 | Young . |
| 5,183,312 | 2/1993 | Nania . |
| 5,318,339 | 6/1994 | Cherniak . |
| 5,390,978 | 2/1995 | Janisch ................................. 297/240 X |
| 5,427,426 | 6/1995 | Grappo . |

*Primary Examiner*—Anthony D. Barfield
*Attorney, Agent, or Firm*—Ormiston Korfanta & Holland, PLLC

[57] ABSTRACT

A swivel seat for a vehicle that provides a fixed seating platform surrounding a swivel seating platform and a smooth transition from the edge of the vehicle seat to the seating platform. In one version of the invention the swivel seat includes a rotatable inner portion and a fixed outer portion surrounding the inner portion. Preferably, the inner portion is elevated above the surrounding outer portion only enough to allow the inner portion to rotate freely. That is, the inner and outer portions are nearly flush with one another. In a second version, the seat includes a rotatable seating platform and a curved lip disposed adjacent to and extending away from the seating platform. The lip is configured to conform generally to the edge of a vehicle seat to provide a smooth transition from the edge of the vehicle seat to the seating platform. These two novel features may be combined in a swivel seat that includes the two piece seating platform and the lip. In this third version of the invention, the seating platform has a rotatable, preferably round, inner portion and a fixed, preferably rectangular, outer portion surrounding the inner portion. The curved lip extends away from one side of the outer portion of the seating platform.

8 Claims, 5 Drawing Sheets

SWIVEL SEAT FOR A VEHICLE

FIELD OF THE INVENTION

The invention relates generally to vehicle seat and, more particularly, to a swivel seat that helps elderly and disabled persons easily and safely get into and out of the vehicle

BACKGROUND

It is difficult and uncomfortable for many persons to get into and out of a vehicle. The tiny entry way into small cars makes if tough for all but the most petite and agile people. The cloth seats popular in many vehicles makes it virtually impossible for some elderly and disabled persons to slide in and pivot on the seat to reach the desired driving or riding position. And, a cloth bucket seat, well, if you've just had hip replacement surgery you might as well stay home as try to get into a car that has cloth bucket seats.

A variety of different swivel seats have been designed to help people get into and out of a vehicle. The most basic design is embodied in the "Swivel Cushion." The Swivel Cushion, which is available commercially, consists of a round cloth covered padded disc that swivels on a round base plate that lays on the vehicle seat. U.S. Pat. No. 5,318,339 to Cherniak titled Vehicular Portable Swivel Seat, describes a portable swivel seat that is strapped on to the vehicle seat. The seat described in Cherniak, like the Swivel Cushion, utilizes a round padded disc that swivels on a round base plate that lays on the vehicle seat. A third design is described in U.S. Pat. No. 5,427,426 to Grappo titled Seat Accessory. In Grappo, the swivel seat is contoured to fit a persons bottom. In each of these conventional designs, the swivel seat sits fully on top of the base plate and there is no fixed seating platform surrounding the rotatable seating platform to help support the user. In addition, none of these swivel seats offer a transition from the edge of the vehicle seat to the swivel seat.

SUMMARY OF THE INVENTION

The present invention is directed to a swivel seat for a vehicle that provides a fixed seating platform surrounding a swivel seating platform and a smooth transition from the edge of the vehicle seat to the seating platform. Accordingly, in one version of the invention the swivel seat includes a rotatable inner portion and a fixed outer portion surrounding the inner portion. Preferably, the inner portion is elevated above the surrounding outer portion only enough to allow the inner portion to rotate freely. That is, the inner and outer portions are nearly flush with one another. In a second version, the seat includes a rotatable seating platform and a curved lip disposed adjacent to and extending away from the seating platform. The lip is configured to conform generally to the edge of a vehicle seat to provide a smooth transition from the edge of the vehicle seat to the seating platform. These two novel features may be combined in a swivel seat that includes the two piece seating platform and the lip. In this third version of the invention, the seating platform has a rotatable, preferably round, inner portion and a fixed, preferably rectangular, outer portion surrounding the inner portion. The curved lip extends away from one side of the outer portion of the seating platform.

The invention, as summarized above and defined in the Claims at the end of this Specification, may be better understood with reference to the drawings and the following detailed description of the preferred embodiments.

DETAILED DESCRIPTION

Figure 1:
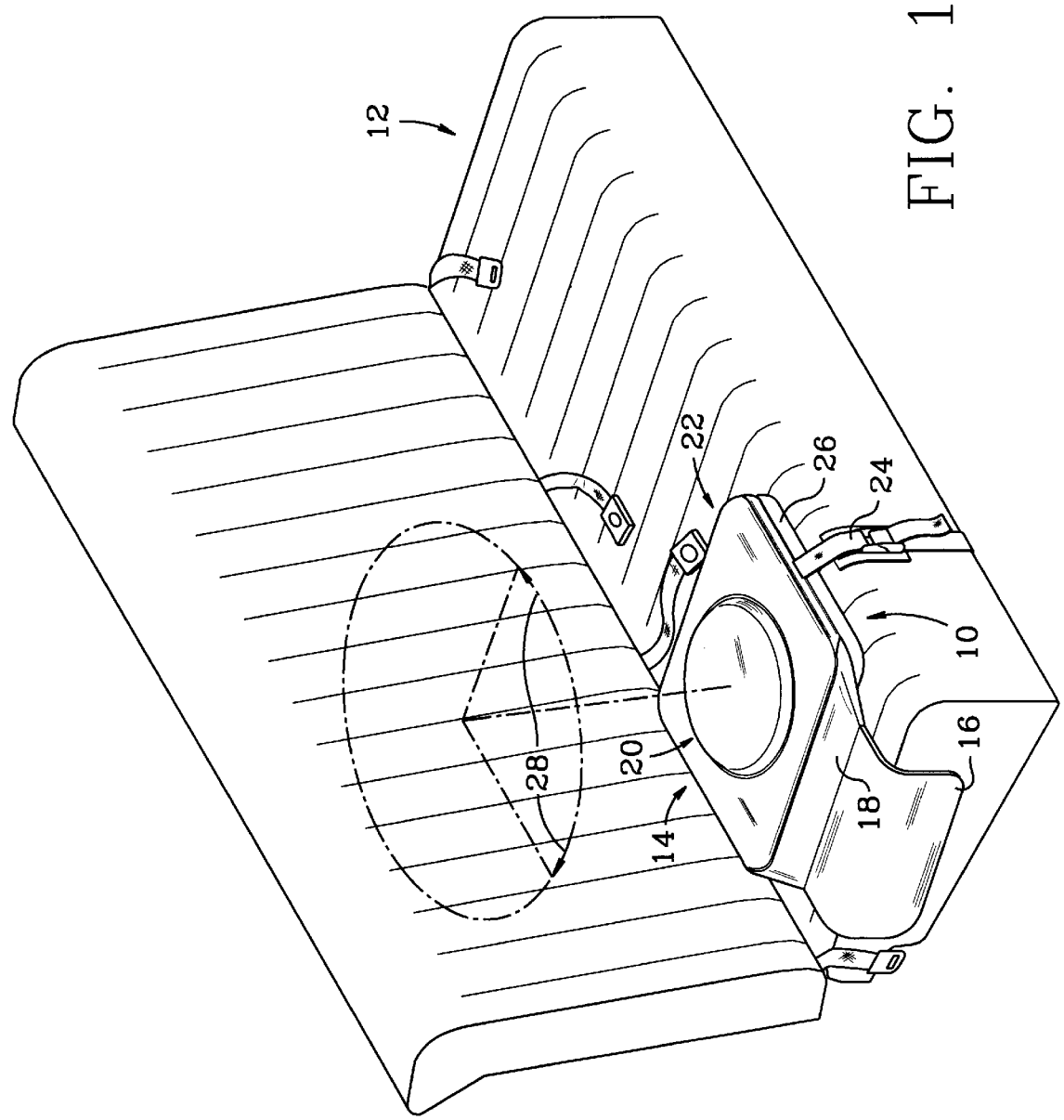
FIG. 1 is an isometric view of a swivel seat constructed according to one embodiment of the invention in place on a bench seat.
Figure 2:
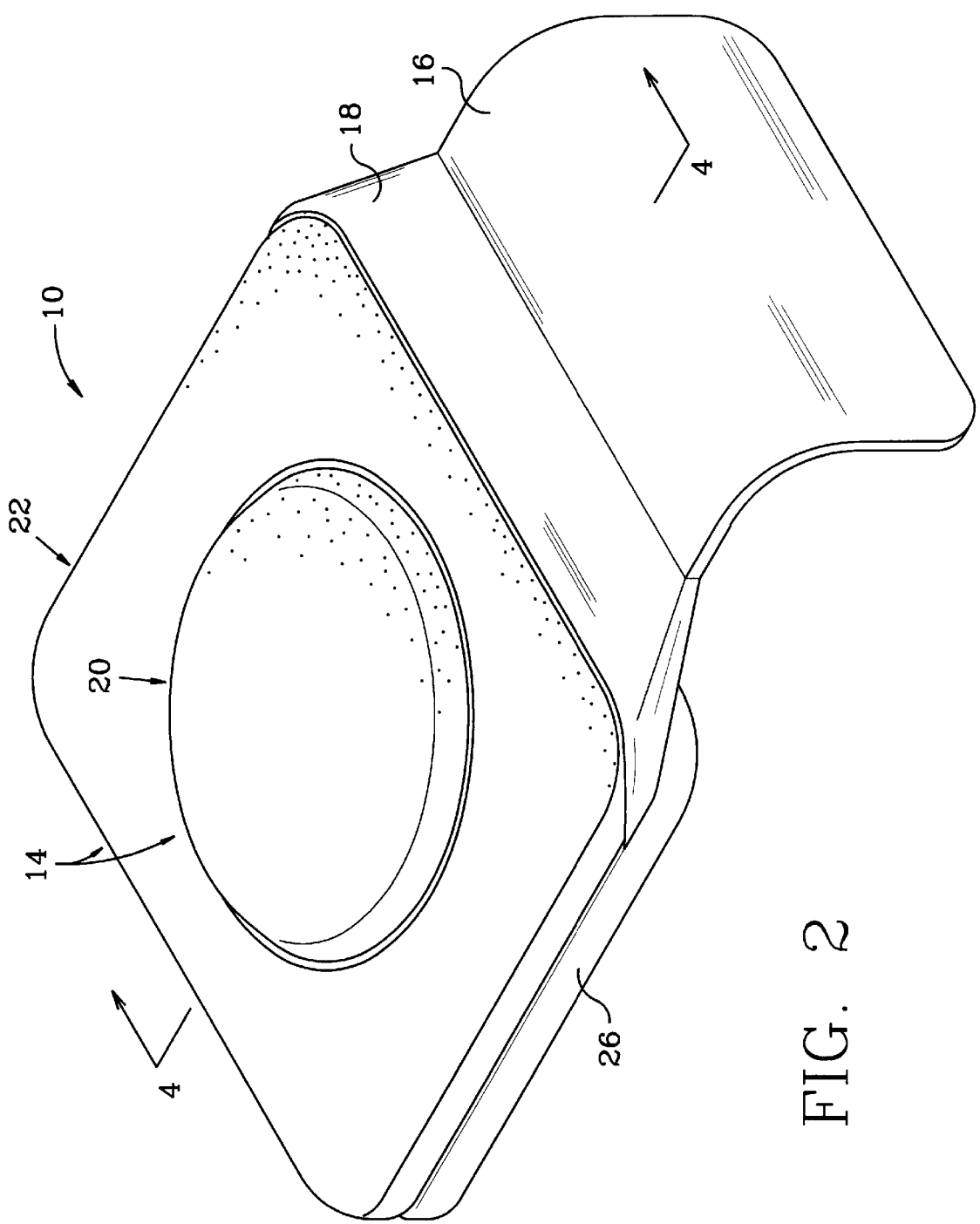
FIG. 2 is a more detailed isometric view of the swivel seat of FIG. 1.

FIGS. 1 and 2 illustrate a swivel seat 10 constructed according to one embodiment of the invention. In FIG. 1, seat 10 is shown installed on a bench seat 12 in a car, truck, sport utility vehicle or the like. The external features of seat 10 will be described generally with reference to FIGS. 1 and 2. The internal features of seat 10 will then be detailed with reference to the exploded assembly and cross section views of FIGS. 3 and 4.

Referring to FIGS. 1 and 2, seat 10 includes a seating platform 14 and a curved extension or "lip" 16 that extends away from seating platform 14 along one side of seat 10. For those configurations of seat 10 in which seating platform 14 is higher than lip 16, such as the one shown in FIGS. 1 and 2, seat 10 should include a ramped transition piece 18. In this embodiment, ramp 18 is constructed as an integral part of lip 16. Alternatively, ramp 18 might be constructed as part of seating platform 14 or as a discrete piece that extends between lip 16 and the elevated seating platform 14. Seating platform 14 consists of an inner seating portion 20 and an outer seating portion 22 surrounding inner seating portion 20. For convenience, inner seating portion 20 is sometimes referred to simply as inner seat 20 and outer seating portion 22 as outer seat 22. Seat 10 may be secured to car seat 12 as necessary or desired with, for example, a buckle strap 24 that goes around car seat 12 from front to rear.

Inner seat 20 is supported by and swivels on a base 26 as indicated by arrows 28 in FIG. 1. Outer seat 22 is fixed to base 26. Preferably, both portions 20 and 22 of seating platform 14 are padded for user comfort and covered with a smooth material to allow the user to slide easily on to the seat. Similarly, lip 16 and transition piece 18 are made of a smooth material to allow the user to slide easily over the edge of the car seat 12 and on to seating platform 14. The texture of the covering material and the degree of padding may be varied as necessary or desirable to accommodate specific users, vehicles or other use parameters.

Figure 3:
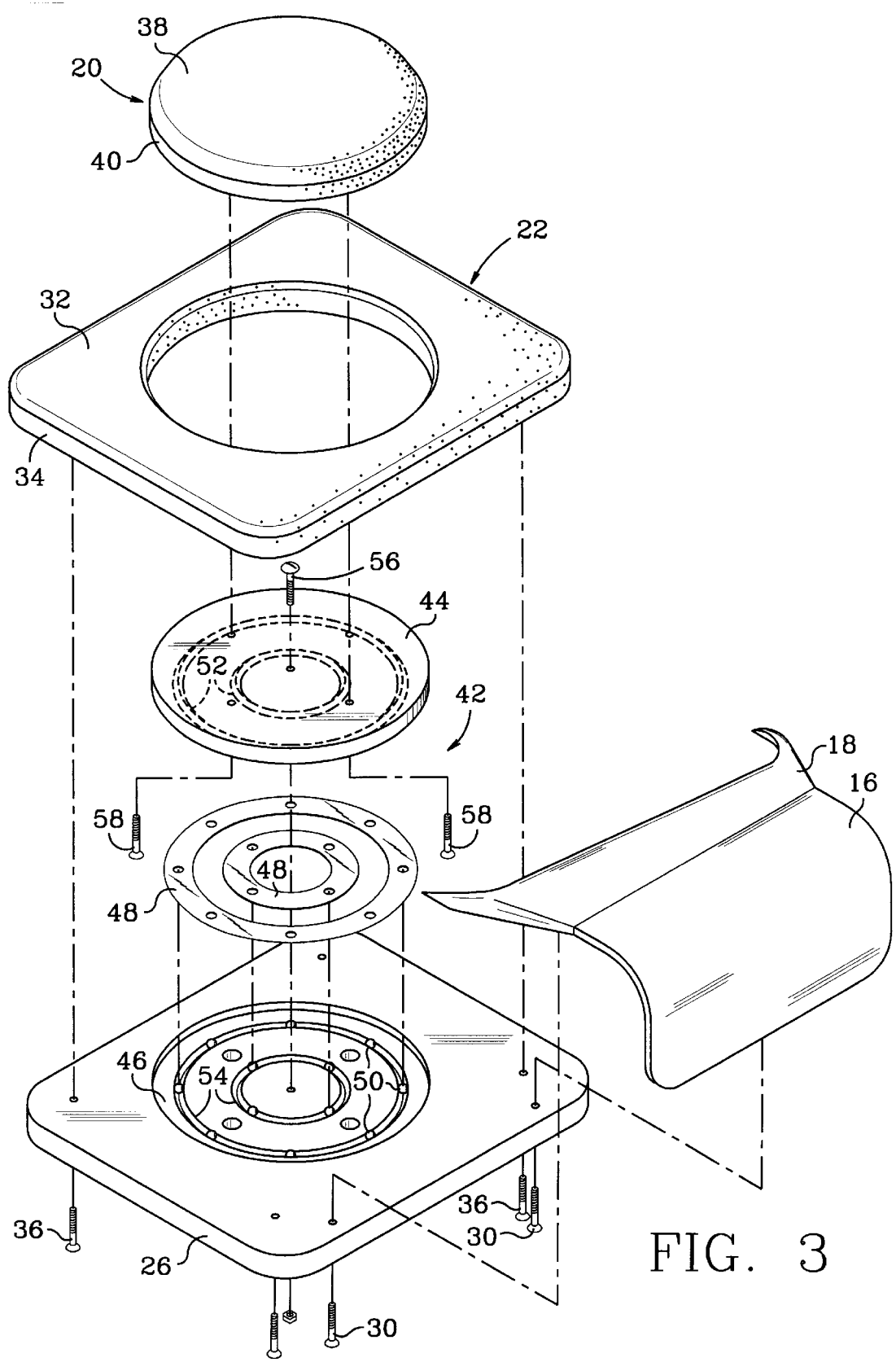
FIG. 3 is an exploded isometric view of the swivel seat of FIG. 2.
Figure 4:
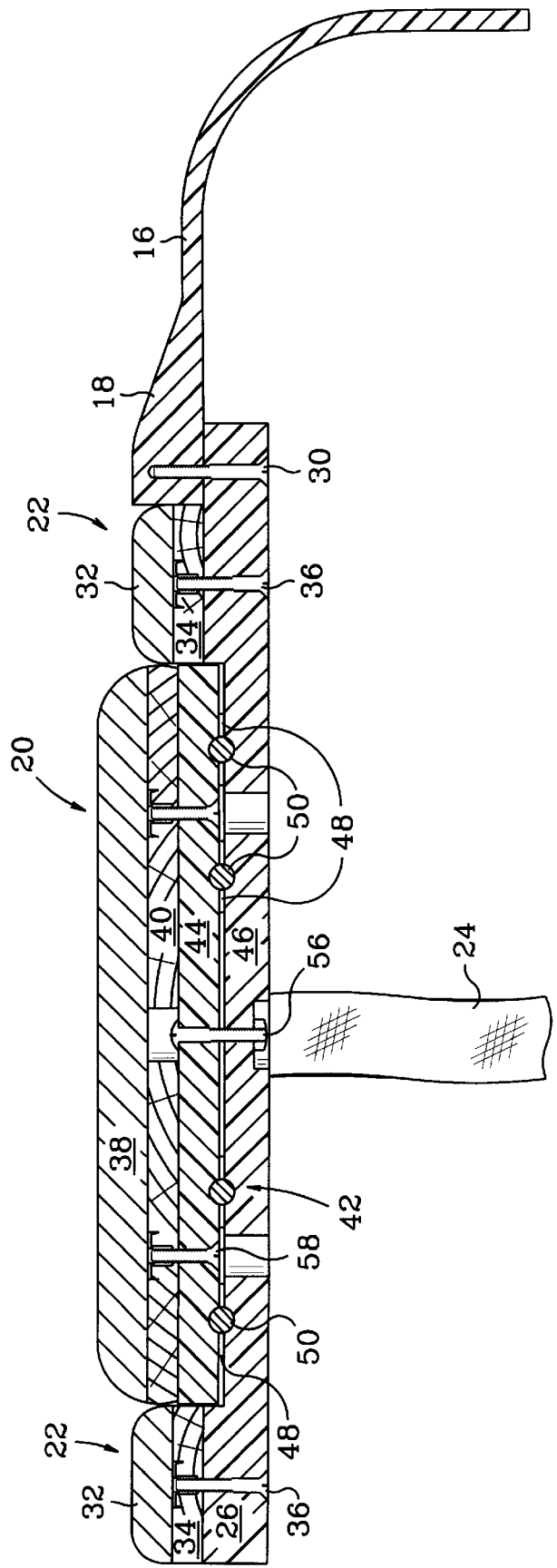
FIG. 4 a section view of the swivel seat taken along the line 4—4 in FIG. 2.

Referring now to FIGS. 3 and 4, lip 16 is glued, fastened or otherwise secured to base 26 with, for example, screws 30. Outer seat 22 consists of a padded upper portion 32 glued, fastened or otherwise secured to a rigid lower portion 34. Lower portion 32 is glued, fastened or otherwise secured to base 26 with, for example, screws 36. Inner seat 20 consists of a padded upper portion 38 glued, fastened or otherwise secured to a rigid lower portion 40. Inner seat 20 is operatively coupled to base 26 through a lazy Susan type bearing assembly 42. Bearing assembly 42 includes an upper bearing plate 44, a lower bearing plate 46, a bearing retainer 48 and ball bearings 50. Upper bearing races 52 are formed in the lower surface of upper bearing plate 44. Lower bearing races 54 are formed in the upper surface of lower bearing plate 46. In the embodiment shown in FIGS. 3 and 4, base 26 serves as lower bearing plate 46. Retainer 48, which is sandwiched between the upper and lower bearing plates 44 and 46, includes holes 56. Holes 56 are sized and shaped to fit closely around ball bearings 50 without constricting rotation of the ball bearings. Upper bearing plate 44 is secured to lower bearing plate 46 by a bolt 56 positioned at the center of rotation of bearing assembly 42. Lower portion 40 of inner seat 20 is glued, fastened or other secured to upper bearing plate 44 with, for example, screws 58.

As best seen in FIG. 4, inner seat 20 is nearly flush with the surrounding outer seat 22. Inner seat 20 should be raised above outer seat 22 only as much as necessary to allow inner seat 20 to swivel. Keeping inner and outer seats 20 and 22 nearly flush with one another makes it easier for the user to slide onto seat 10 and makes seat 10 more comfortable. Although the extent to which inner seat 20 is raised above outer seat 22 will vary depending on the amount and firmness of padded upper portions 32 and 38 and the diameter of inner seat 20, it is expected that a 9 inch diameter firmly padded inner seat 20 need be no more than ½ inch above outer seat 22.

Upper and lower bearing plates 44 and 46 and bearing retainer 48 are made of polyvinyl chloride (PVC) or another suitably rigid wear resistant material. It is expected that eight 5/16 inch diameter steel ball bearings will be adequate to allow inner seat 20 to swivel freely under a reasonable range of load conditions.

Figure 5:
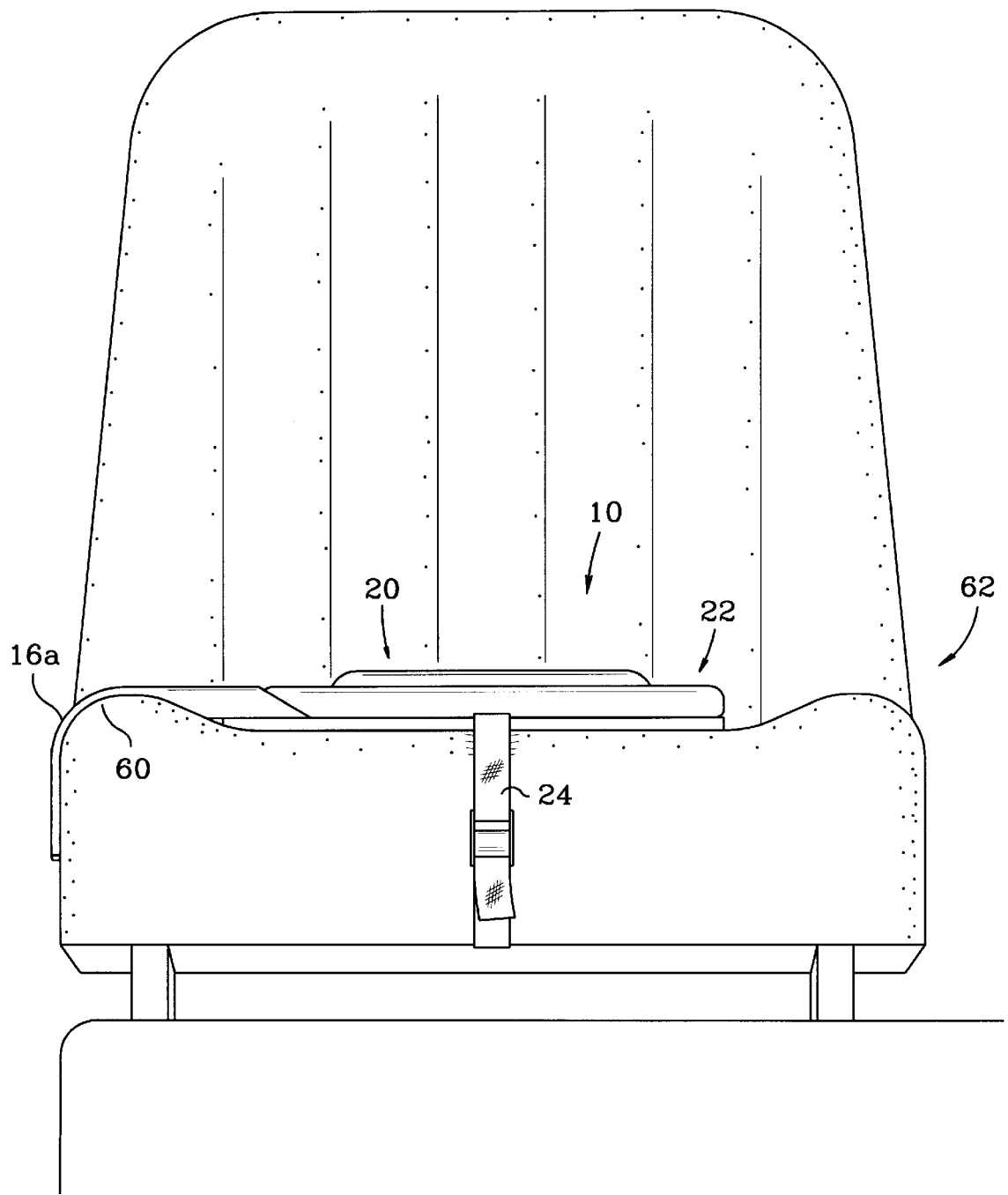
FIG. 5 is front elevation and partial cut-away view of a swivel seat constructed according to a second embodiment of the invention in place on a bucket seat.

Although the invention has been shown and described with reference to the foregoing preferred embodiment, various other embodiments of the invention are possible. For example, the invention is not limited to the lazy Susan type of bearing assembly described above. Any suitable bearing that allows inner seat 20 to swivel freely under a reasonable range of load conditions may be used. The configuration of lip 16 may be varied to accommodate different types of vehicle seats. For example, FIG. 5 illustrates swivel seat 10 with a lip 16*a* that rolls up to fit over the raised edge 60 of a bucket seat 62. It is to be understood, therefore, that these and other embodiments may be made without departing from the spirit and scope of the invention which is defined in the following claims.

What is claimed is:

1. A swivel seat for a vehicle, comprising a rotatable seating platform and a curved lip having a smooth planar upper surface disposed along the seating platform and extending away from the seating platform to a curved portion configured to curve down over an edge of a vehicle seat when the swivel seat is installed in the vehicle.

2. The seat according to claim 1, further comprising a fixed seating platform surrounding the rotatable seating platform, a portion of the fixed seating platform interposed between the upper surface of the lip and the rotatable seating platform.

3. A swivel seat for a vehicle, comprising:
    a seating platform having a rotatable inner portion and a fixed outer portion surrounding the inner portion; and
    an extension having a smooth planar surface extending away from one side of the seating platform, the extension extends to a curved portion, configured to conform generally to an edge of a vehicle seat when the swivel seat is installed in the vehicle.

4. The seat according to claim 3, wherein the platform is padded.

5. A swivel seat for a vehicle, comprising:
    a base;
    a round inner seat rotatably coupled to the base;
    a rectangular outer seat secured to the base, the outer seat surrounding the inner seat and the inner seat higher than the outer seat; and
    a curved lip secured to the base, the lip having a smooth planar surface disposed along one side of the outer seat and extending away from the one side of the outer seat to a curved portion configured to curve down over an edge of a vehicle seat when the swivel seat is installed in the vehicle.

6. The seat according to claim 5, further comprising a bearing rotatably coupling the inner seat to the base.

7. The seat according to claim 5, wherein the inner and outer seats each comprise a padded upper portion secured to a rigid lower portion.

8. The seat according to claim 5, wherein the inner seat is nearly flush with the outer seat.

\* \* \* \* \*